(12) United States Patent
Clos et al.

(10) Patent No.: US 9,988,160 B1
(45) Date of Patent: Jun. 5, 2018

(54) AIRPLANE FIRE DETECTION SYSTEM

(71) Applicant: THE BOEING COMPANY, Chicago, IL (US)

(72) Inventors: William Robert Clos, Mukliteo, WA (US); Darrin M. Noe, Arlington, WA (US)

(73) Assignee: The Boeing Company, Chicago, IL (US)

( * ) Notice: Subject to any disclaimer, the term of this patent is extended or adjusted under 35 U.S.C. 154(b) by 0 days. days.

(21) Appl. No.: 15/586,934

(22) Filed: May 4, 2017

(51) Int. Cl.
*B64D 17/80* (2006.01)
*B64D 45/00* (2006.01)
*G08B 17/00* (2006.01)

(52) U.S. Cl.
CPC .............. *B64D 45/00* (2013.01); *G08B 17/00* (2013.01); *B64D 2045/009* (2013.01)

(58) Field of Classification Search
CPC ........ G08B 25/14; G08B 17/00; G08B 17/06; G08B 17/113; G08B 17/125; G08B 29/183; G08B 17/10; A62C 37/44; B64D 13/00
USPC ..... 340/584, 521, 425.5, 628, 606; 422/136, 422/139, 60; 169/61
See application file for complete search history.

(56) References Cited

U.S. PATENT DOCUMENTS

| | | | | |
|---|---|---|---|---|
| 5,899,414 | A * | 5/1999 | Duffoo .................. | B64D 17/80 169/60 |
| 6,670,291 | B1 * | 12/2003 | Tompkins ............... | B32B 27/12 428/332 |
| 2003/0189132 | A1 * | 10/2003 | Brady ..................... | B60H 1/00 244/118.5 |
| 2005/0146427 | A1 * | 7/2005 | Mazzone ............... | G08B 17/00 340/521 |
| 2011/0147524 | A1 | 6/2011 | Behle et al. | |
| 2011/0224947 | A1 * | 9/2011 | Kriss ..................... | F24F 3/1603 702/179 |
| 2011/0240798 | A1 | 10/2011 | Gershzohn et al. | |
| 2012/0229283 | A1 * | 9/2012 | McKenna .............. | G08B 17/06 340/584 |
| 2014/0313061 | A1 | 10/2014 | Gatsonides et al. | |
| 2015/0034342 | A1 * | 2/2015 | Seebaluck ............. | A62C 37/44 169/61 |
| 2015/0053431 | A1 * | 2/2015 | Graham ................. | A62C 3/08 169/61 |
| 2017/0056694 | A1 * | 3/2017 | Slaton .................... | B32B 5/024 |

* cited by examiner

*Primary Examiner* — George Bugg
*Assistant Examiner* — Munear Akki
(74) *Attorney, Agent, or Firm* — Charles L. Moore; Moore & Van Allen PLLC

(57) ABSTRACT

A fire detection system includes a heat detector controller and a multiplicity of heat detectors. The heat detectors are positioned at predetermined locations along a ceiling of a cargo compartment and/or on an exterior side of a cargo compartment liner from an interior of the cargo compartment. Each of the multiplicity of heat detectors are configured to measure temperature and to transmit temperature measurements to the heat detector controller. The heat detector controller is configured to determine that a fire has breached the cargo compartment liner based on the temperature measurements.

20 Claims, 3 Drawing Sheets

AIRPLANE FIRE DETECTION SYSTEM

FIELD

The present disclosure relates to fire detection systems, and more particularly to an airplane fire detection system.

BACKGROUND

Aircraft include smoke detection systems in the cargo areas of the aircraft that alert the crew to dispense Halon in the cargo compartment or to decompress or control airflow within the cargo compartment to suppress any fire in the cargo compartment by oxygen starvation until the aircraft can be safely landed. However, the smoke detection systems do not detect when a fire onboard an aircraft has breached the cargo compartment liner or if the fire is caused by an article or substance that cannot be suppressed by oxygen starvation, such as a load of lithium batteries or other material that will burn with little or no oxygen.

SUMMARY

In accordance with an embodiment, a fire detection system includes a heat detector controller and a multiplicity of heat detectors. The heat detectors are positioned at predetermined locations along a ceiling of a cargo compartment and/or on an exterior side of a cargo compartment liner from an interior of the cargo compartment. Each of the multiplicity of heat detectors are configured to measure temperature and to transmit temperature measurements to the heat detector controller. The heat detector controller is configured to determine that a fire has breached the cargo compartment liner based on the temperature measurements.

In accordance with another embodiment, a fire detection system includes a heat detector controller and a multiplicity of heat detectors positioned at predetermined locations along a ceiling of a cargo compartment and/or on an exterior side of a cargo compartment liner from an interior of the cargo compartment. Each of the multiplicity of heat detectors are configured to measure temperature and to transmit temperature measurements to the heat detector controller. The heat detector controller is configured to determine that a fire has breached the cargo compartment liner based on the temperature measurements. The fire detection system also includes a smoke detector controller and a plurality of smoke detectors positioned at preset locations along the ceiling of the cargo compartment. Each of the plurality of smoke detectors are at least partially exposed through the cargo compartment liner for detecting smoke in the cargo compartment, and each of the plurality of smoke detectors are configured to detect smoke within the cargo compartment and transmit a signal to the smoke detector controller in response to detecting smoke.

In accordance with a further embodiment, a method for detecting a fire includes positioning a multiplicity of heat detectors at predetermined locations along a ceiling of a cargo compartment and/or on an exterior side of a cargo compartment liner from an interior of the cargo compartment. Each of the multiplicity of heat detectors are configured to measure temperature and to transmit temperature measurements to a heat detector controller. The method also includes receiving the temperature measurements by the heat detector controller and determining, by the heat detector controller, that a fire has breached the cargo compartment liner based on the temperature measurements.

In accordance with another embodiment or any of the previous embodiments, the heat detector controller determines that the fire has breached the cargo compartment in response to a group of temperature measurements from at least one heat detector exceeding a preset threshold value for a predetermined time duration.

In accordance with another embodiment or any of the previous embodiments, the heat detector controller is configured to provide an alarm in response to determining that the fire has breached the cargo compartment liner.

In accordance with another embodiment or any of the previous embodiments, the alarm includes at least one of a fire bell warning, activation of a warning light on a display or pilot glare shield, activation of an affected cargo fire panel light, and annunciation of a warning message on an Engine Indication and Crew Alerting system (EICAS).

In accordance with another embodiment or any of the previous embodiments, the multiplicity of heat detectors are implemented in pairs.

In accordance with another embodiment or any of the previous embodiments, each of the heat detectors comprise a thermocouple.

In accordance with another embodiment or any of the previous embodiments, the cargo compartment liner includes a fire resistant material.

In accordance with another embodiment or any of the previous embodiments, at least one of the multiplicity of heat detectors is respectively collocated with each of the plurality of smoke detectors.

In accordance with another embodiment or any of the previous embodiments, the at least one heat detector is mounted on a side of an associated smoke detector that is on the exterior side of the cargo compartment liner.

In accordance with another embodiment or any of the previous embodiments, a pair of heat detectors are associated with each smoke detector.

In accordance with another embodiment or any of the previous embodiments, the smoke detectors are operatively coupled to the heat detectors.

In accordance with another embodiment or any of the previous embodiments, each of the plurality of smoke detectors is configured to transmit a signal to a smoke detector controller in response to detecting smoke.

In accordance with another embodiment or any of the previous embodiments, the multiplicity of heat detectors are distributed at a closer distance from one another than the smoke detectors.

In accordance with another embodiment or any of the previous embodiments, the fire detection system is onboard an aircraft.

The features, functions, and advantages that have been discussed can be achieved independently in various embodiments or may be combined in yet other embodiments further details of which can be seen with reference to the following description and drawings.

DETAILED DESCRIPTION

Figure 1:
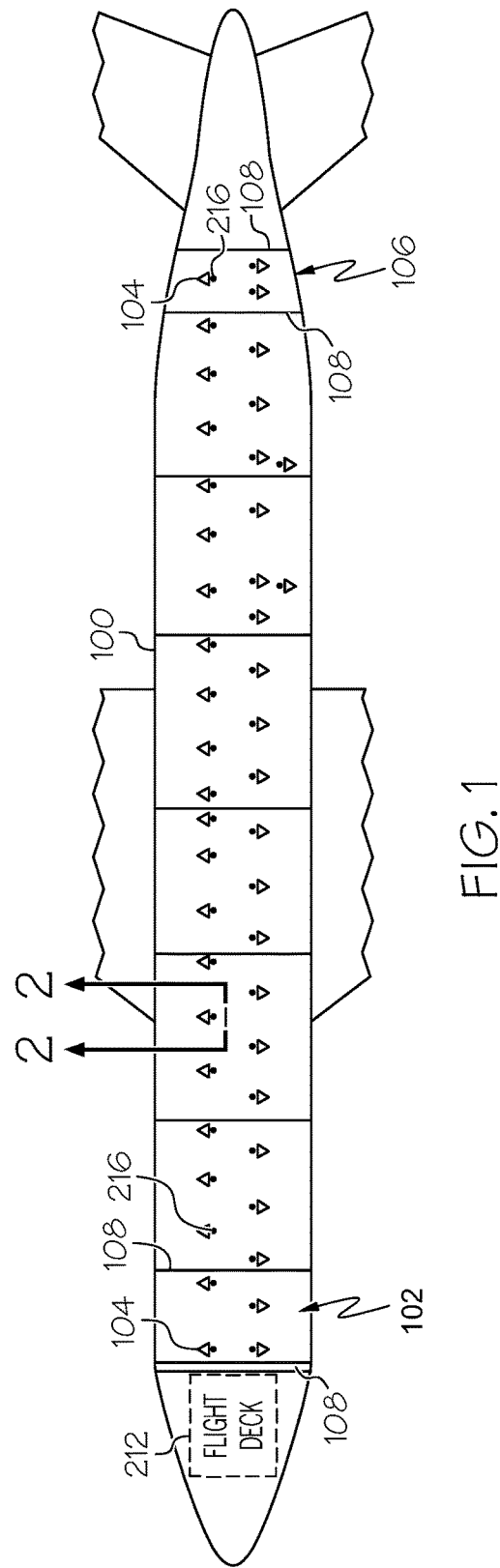
FIG. 1 is an illustration of an exemplary aircraft showing an example of a distribution of a multiplicity of heat detectors and smoke detectors in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Certain terminology is used herein for convenience only and is not to be taken as a limitation on the embodiments described. For example, words such as "proximal", "distal", "top", "bottom", "upper," "lower," "left," "right," "horizontal," "vertical," "upward," and "downward", etc., merely describe the configuration shown in the figures or relative positions used with reference to the orientation of the figures being described. Because components of embodiments can be positioned in a number of different orientations, the directional terminology is used for purposes of illustration and is in no way limiting. Based on the disclosure herein, it is to be understood that other embodiments may be utilized and structural or logical changes may be made without departing from the scope of the present disclosure. The following detailed description, therefore, is not to be taken in a limiting sense, and the scope of the present disclosure is defined by the appended claims.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is an illustration of an exemplary aircraft 100 showing an example of a distribution 102 of a multiplicity of heat detectors 104 or heat detector devices and smoke detectors 216 in accordance with an embodiment of the present disclosure. In accordance with an embodiment, the aircraft 100 is an aircraft for carrying freight. The aircraft 100 includes one or more cargo compartments 106. In the exemplary embodiment illustrated in FIG. 1, the aircraft 100 includes a plurality of cargo compartments 106. In another embodiment, the aircraft 100 is a passenger aircraft and includes one or more cargo compartments 106 beneath a passenger compartment (not shown in FIG. 1). Each of the cargo compartments 106 is separated by a bulkhead or firewall 108.

Figure 2:
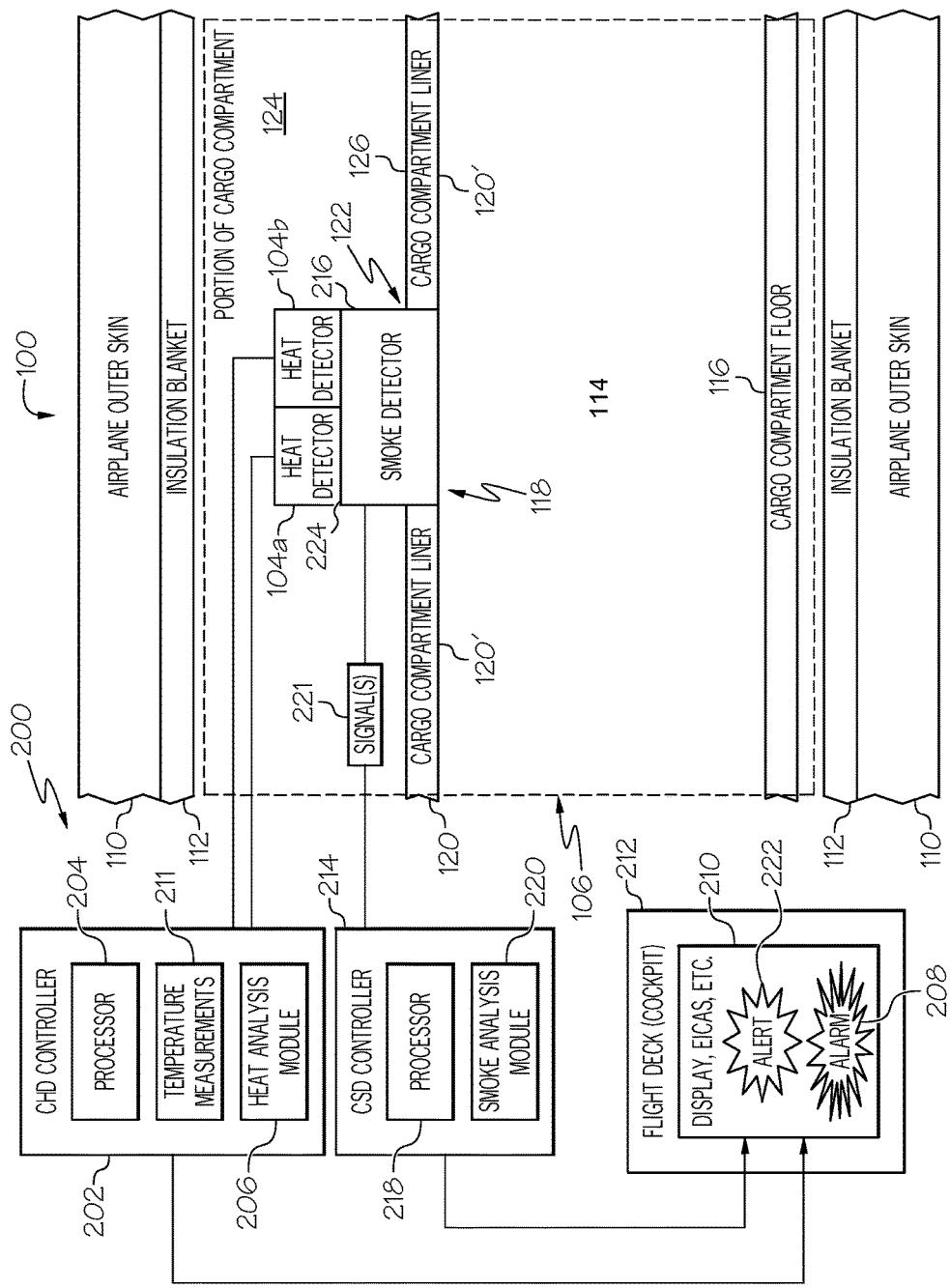
FIG. 2 is a partial cross-sectional view of the exemplary aircraft in FIG. 1 taken along lines 2-2 and block schematic diagram of an example of a fire detection system in accordance with an embodiment of the present disclosure.

Referring also to FIG. 2, FIG. 2 is a partial cross-sectional view of the exemplary aircraft 100 in FIG. 1 taken along lines 2-2 and a block schematic diagram of an example of a fire detection system 200 in accordance with an embodiment of the present disclosure. FIG. 2 illustrates an elevation view of a portion of a cargo compartment 106. The aircraft 100 includes an outer skin 110. Examples of the outer skin 110 include but are not necessarily limited to a composite material including a plurality of layers of material. In other embodiments, the outer skin includes a sandwich structure including a honeycomb layer formed from a lightweight metallic material sandwiched between an outer layer of a metallic material and an inner layer of metallic material. Examples of the metallic material include but are not limited to aluminum, an aluminum alloy or other lightweight high strength metallic material or other material as is commonly used in the aircraft or aerospace industry. An insulation blanket 112 is disposed on the airplane outer skin 110 within the cargo compartment 106. The insulation blanket 112 is configured to avoid the effects of environmental conditions or changes in environmental conditions on an interior 114 of the cargo compartment 106, such as condensation, temperature, or noise.

In accordance with an embodiment, the cargo compartment 106 includes a floor 116 and a ceiling 118. The cargo compartment ceiling 118 and walls include a cargo compartment liner 120. The cargo compartment liner 120 is formed from a fire resistant material such as a fire resistant fiberglass material, composite material or other fire resistant material. Nearly all passenger and freighter airplane cargo compartments include liners that have been shown to meet the Title 14. Code of Federal Regulations part 25, Appendix F, part III test requirement (i.e., large oil burner flame penetration test). Passing the test requires an oil burner flame, which simulates a controlled cargo fire, not penetrate the liner 120 or its joints. The test also requires the temperature measured 4 inches above and behind the liner 120 not exceed 400 degrees Fahrenheit (F). Accordingly, a sudden increase of temperature above about 400 degrees F. would be an indication that the cargo compartment liner 120 has failed or been breached and the flame and/or heat may impinge on airplane systems and/or structure outside the liner 120. In accordance with an embodiment, the cargo compartment liner 120 is formed from a plurality of cargo compartment panels 120' that are fastened together by joints to form a fire resistant barrier 122 between the interior 114 of the cargo compartment 106 and an open area 124 between the cargo compartment liner 120 and the insulation blanket 112.

In accordance with an embodiment, the fire detection system 200 includes a heat detector controller 202 or cargo heat detector (CHD) controller. The fire detection system 200 also includes a multiplicity of heat detectors 104 positioned at predetermined locations along the ceiling 118 of the cargo compartment 106 and/or on an exterior side 126 of the cargo compartment liner 120 from the interior 114 of the cargo compartment 106. Examples of a heat detector 104 include a thermocouple or any heat detector device capable of generating a signal corresponding to a temperature measured by the device and that is able to withstand temperatures of about 1700 degrees F. or higher without failing or being damaged. In accordance with an exemplary embodiment, the heat detectors 104 are implemented in pairs of heat detectors 104a and 104b to ensure that the failure of a single heat detector 104 does not result in a false warning to the flight deck 212 or cockpit.

Each of the multiplicity of heat detectors 104 are configured to measure temperature and to transmit signals corresponding to the temperature measurements to the heat detector controller 202. The heat detector controller 202 is configured to determine that a fire has breached the cargo compartment liner 120 based on the temperature measurements. In accordance with an example, the heat detector controller 202 includes a processor 204 and heat analysis module 206 operable on the processor 204. The heat analysis module 206 analyzes the temperature measurements from the heat detectors 104 to determine that a fire has breached the cargo compartment liner 120 and generates an alarm 208 in response to making the determination that the fire has breached the cargo compartment liner 120. The alarm 208 is presented on a display 210 on the flight deck 212 or cockpit of the aircraft 100. An example of a method for detecting that a fire has breached the cargo compartment liner 120 is described with reference to FIG. 3. In accordance with an embodiment, the heat detector controller 202 or heat analysis module 206 determines that the fire has breached the cargo compartment liner 120 in response to a group of temperature measurements 211 from at least one heat detector 104 exceeding a preset threshold value for a predetermined time duration as described in more detail with reference to FIG. 3.

In accordance with an embodiment, the alarm 208 includes at least at least one of a fire bell warning, activation of a warning light on the display 210 or pilot glare shield, activation of an affected cargo fire panel light, and annunciation of a warning message on an Engine Indication and Crew Alerting system (EICAS) or any other type of audible, visual or combination audible and visual alarm.

In accordance with an embodiment, the fire detection system 200 also includes a smoke detector controller 214 or cargo smoke detector (CSD) controller and a plurality of smoke detectors 216 as best shown in FIG. 1. Only a single smoke detector 216 is shown in FIG. 2 in order to show more detail. Referring also to FIG. 1, each of the smoke detectors 216 are positioned at a preset location along the ceiling 118 of the cargo compartment 106 and are at least partially exposed through the cargo compartment liner 120 for detecting smoke in the interior 114 of the cargo compartment 106 as illustrated in the example in FIG. 2. Each of the plurality of smoke detectors 216 are configured to detect smoke within the cargo compartment 106 or within the cargo compartment liner 120 and transmit a signal 221 to the smoke detector controller 214 in response to detecting smoke. In accordance with an example, the smoke detector controller 214 includes a processor 218 and a smoke analysis module 220 operable on the processor 218. The smoke analysis module 220 analyzes signals or measurements from the smoke detectors 216 to determine that there is a fire in the cargo compartment 106 and generates an alert 222 in response to making the determination that there is a fire in the cargo compartment 106. The alert 222 is distinguishable from the alarm 208. The alert 222 notifies the flight crew to take actions to extinguish the fire by dispensing Halon into the cargo compartment 106 or by decompressing or controlling the airflow within the cargo compartment 106 to starve the fire from oxygen. However, if the fire is unable to be extinguished and breaches the cargo compartment liner 120, the alarm 208 signifies that the fire has breached the cargo compartment is generated as described herein. In accordance with an example, the alarm 208 includes a message, such as for example, "abort the flight—uncontrollable fire" or similar warning that the pilot needs to land the aircraft 100 as soon as possible or ditch the aircraft 100 if over water and unable to reach an airport within a reasonable amount of time.

In accordance with an embodiment, each of the multiplicity of heat detectors 104 are respectively collocated with a respective one of the plurality of smoke detectors 216, or as shown in the exemplary embodiment of FIG. 2, a pair of heat detectors 104a and 104b is associated with each smoke detector 216 to ensure that the failure of a single heat detector 104 does not result in a false alarm as previously described. For example, at least one heat detector 104 is mounted on a side 224 of a particular smoke detector 216 that is on the exterior side 126 of the cargo compartment liner 120. In accordance with an embodiment, the heat detectors 104 are operatively connected to the smoke detectors 216. In a further embodiment, each heat detector 104 or a pair of heat detectors 104a and 104b are integrally formed with a smoke detector 216.

In accordance with an embodiment, the smoke detector controller 214 and the plurality of smoke detectors 216 define an existing cargo smoke detection system onboard the aircraft 100. The aircraft 100 is then retrofitted to include the multiplicity of heat detectors 104 and the heat detector controller 202. As previously discussed each of the multiplicity of heat detectors 104 or pairs of heat detectors 104 are respectively collocated with a respective one of the plurality of smoke detectors 216.

In another embodiment, the heat detector controller 202 and the smoke detector controller 214 are integrated into a single controller to perform the functions described herein.

In accordance with a further embodiment, the each of the multiplicity of heat detectors 104 or pairs of heat detectors 104 or at least some of the heat detectors 104 are located along the ceiling 118 of the cargo compartment 106 at different locations from the smoke detectors 216. For example, the heat detectors 104 or pairs of heat detectors 104a and 104b are distributed at a closer distance from one another than the smoke detectors 216 or at a wider distance from another than the smoke detectors 216.

In yet a further embodiment, a particular cargo compartment 106 is designated as a hazardous materials cargo compartment for transporting certain hazardous materials. The hazardous materials cargo compartment may be the only cargo compartment that includes both smoke detectors 216 and heat detectors 104 or the hazardous materials cargo compartment includes a higher number and closer spacing of heat detectors 104 compared to other cargo compartments of a similar size or square footage.

Figure 3:
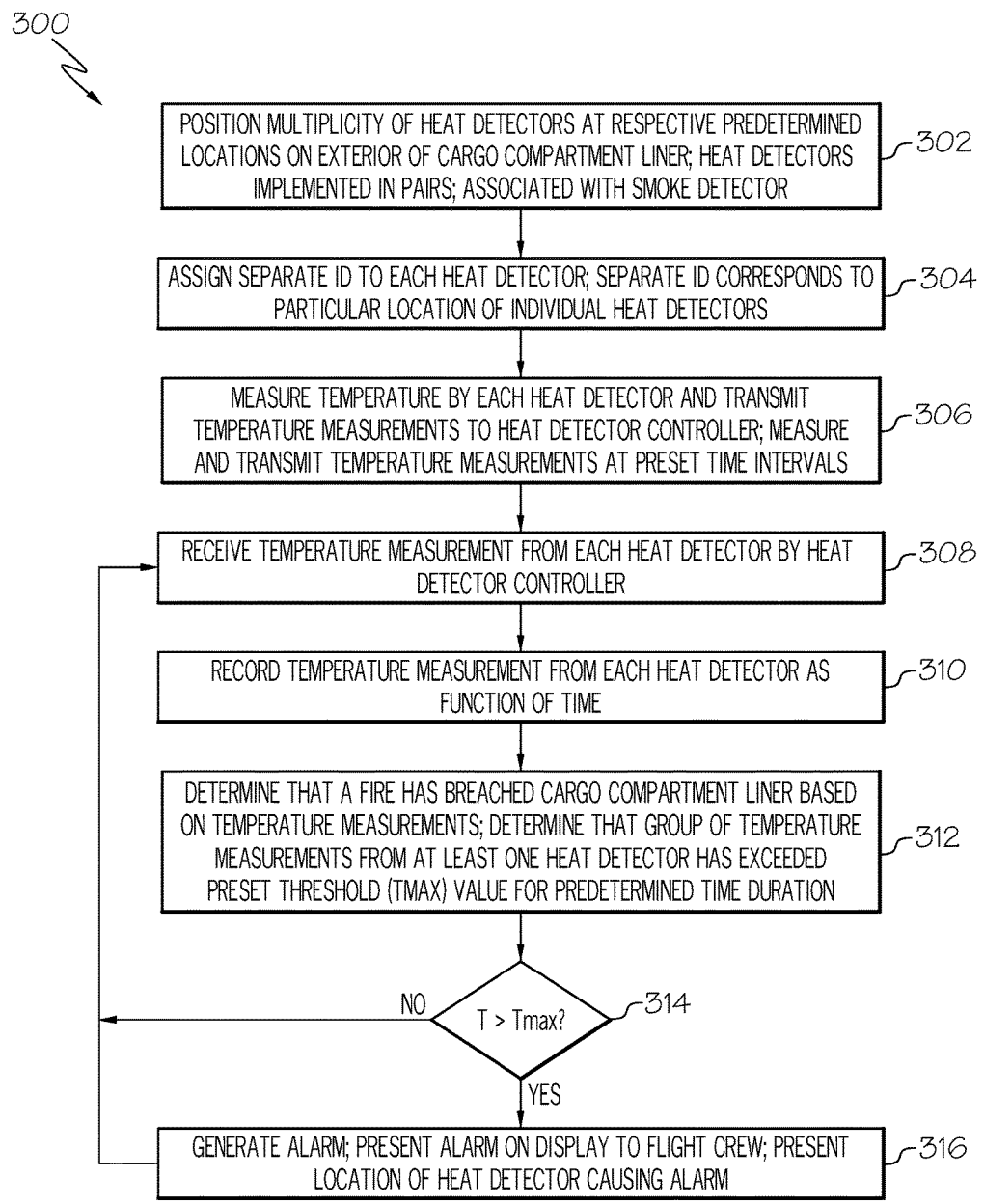
FIG. 3 is a flow chart of an example of a method for detecting that a fire has breached a liner of a cargo compartment of an aircraft in accordance with an embodiment of the present disclosure.

FIG. 3 is a flow chart of an example of a method 300 for detecting that a fire has breached a liner of a cargo compartment of an aircraft in accordance with an embodiment of the present disclosure. In block 302, a multiplicity of heat detectors are positioned at predetermined locations along a ceiling of a cargo compartment and/or on an exterior side of a cargo compartment liner from an interior of the cargo compartment. Each of the multiplicity of heat detectors are configured to measure temperature and to transmit temperature measurements to a heat detector controller. In accordance with an embodiment, as previously described, the heat detectors are implemented in pairs to ensure that the failure of a single heat detector does not result in a false flight deck alarm. Each of the heat detectors or each pair of heat detectors is respectively associated with one of a plurality of smoke detectors. In other embodiments, at least some or all of the heat detectors are separately spaced from the smoke detectors.

In block 304, a separate identification is assigned to each heat detector. The separate identification corresponds to a particular location of individual heat detectors.

In block 306, temperature is measured by each heat detector and temperature measurements are transmitted by each heat detector to a heat detector controller. In accordance with an embodiment, the temperature measurements are transmitted at preset time intervals or continuously. In another embodiment, the heat detector controller polls each of the heat detectors for the temperature measurements at preset time intervals.

In block 308, the temperature measurements are received by the heat detector controller. In block 310, the temperature measurements from each heat detector are recorded or stored as a function of time by the heat detector controller.

In block 312, a determination is made whether a fire has breached the cargo compartment liner by the heat detector controller based on the temperature measurements. In an example, the determination includes determining that a group of temperature measurements from at least one heat detector has exceeded a preset threshold value (Tmax) for a predetermined time duration. The predetermined time duration is sufficiently long to ensure persistence that the preset threshold is exceeded to avoid generating a false alarm.

In block 314, a determination is made whether the group of temperature measurements have exceeded the preset threshold value (Tmax) for the predetermined time duration. If the preset threshold value (Tmax) has not been exceeded for the predetermined time duration, the method 300 returns to block 308 and the heat detector controller continues to receive temperature measurements from each of the heat detectors.

If the preset threshold value (Tmax) has been exceeded for the predetermined time duration in block 314, the method 300 advances to block 316. In block 316, an alarm is generated in response to determining that the fire has breached the cargo compartment liner. As previously described, an example of the alarm includes at least one of a fire bell warning, activation of a warning light on a cockpit display or pilot glare shield, activation of an affected cargo fire panel light, and annunciation of a warning message on an Engine Indication and Crew Alerting system (EICAS) or similar alarm. In another example, a location of the heat detector that caused the alarm is also presented. The heat detector controller may also continue to receive temperature measurements to ensure that the alarm is persistent or to indicate that the fire is spreading based on the locations of other heat detectors that are being presented and that are causing the alarm.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments in the form disclosed. Many modifications and variations will be apparent to those of ordinary skill in the art without departing from the scope and spirit of the examples and embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A fire detection system, comprising:
a heat detector controller;
a multiplicity of heat detectors positioned at predetermined locations on an exterior side of a cargo compartment liner from an interior of a cargo compartment or along a ceiling of the cargo compartment and on the exterior side of the cargo compartment liner from the interior of the cargo compartment, each of the multiplicity of heat detectors are configured to measure temperature and to transmit temperature measurements to the heat detector controller, wherein the heat detector controller is configured to determine that a fire has breached the cargo compartment liner based on the temperature measurements; and
a plurality of smoke detectors positioned at preset locations along the ceiling of the cargo compartment for detecting smoke in the cargo compartment, wherein a pair of heat detectors of the multiplicity of heat detectors are associated with each smoke detector.

2. The fire detection system of claim 1, wherein the heat detector controller determines that the fire has breached the cargo compartment liner in response to a group of temperature measurements from at least one heat detector exceeding a preset threshold value for a predetermined time duration.

3. The fire detection system of claim 1, wherein the heat detector controller is configured to provide an alarm in response to determining that the fire has breached the cargo compartment liner.

4. The fire detection system of claim 3, wherein the alarm comprises at least one of a fire bell warning, activation of a warning light on a display or pilot glare shield, activation of an affected cargo fire panel light, and annunciation of a warning message on an Engine Indication and Crew Alerting System (EICAS).

5. The fire detection system of claim 1, wherein the multiplicity of heat detectors are implemented in pairs.

6. The fire detection system of claim 1, wherein each of the heat detectors comprise a thermocouple.

7. The fire detection system of claim 1, wherein the cargo compartment liner comprises a fire resistant material.

8. The fire detection system of claim 1, wherein each of the plurality of smoke detectors is at least partially exposed through the cargo compartment liner for detecting smoke, and each of the plurality of smoke detectors being configured to detect smoke within the cargo compartment.

9. The fire detection system of claim 8, wherein at least one of the multiplicity of heat detectors is respectively collocated with each of the plurality of smoke detectors.

10. The fire detection system of claim 9, wherein the at least one heat detector is mounted on a side of an associated smoke detector that is on the exterior side of the cargo compartment liner.

11. The fire detection system of claim 8, wherein the smoke detectors are operatively coupled to the heat detectors.

12. The fire detection system of claim 8, wherein each of the plurality of smoke detectors is configured to transmit a signal to a smoke detector controller in response to detecting smoke.

13. The fire detection system of claim 8, wherein the multiplicity of heat detectors are distributed at a closer distance from one another than the smoke detectors.

14. The fire detection system of claim 8, wherein the fire detection system is onboard an aircraft.

15. A fire detection system, comprising:
a heat detector controller;
a multiplicity of heat detectors positioned at predetermined locations on an exterior side of a cargo compartment liner from an interior of a cargo compartment or along a ceiling of the cargo compartment and on the exterior side of the cargo compartment liner from the interior of the cargo compartment, each of the multiplicity of heat detectors are configured to measure temperature and to transmit temperature measurements to the heat detector controller, wherein the heat detector controller is configured to determine that a fire has breached the cargo compartment liner based on the temperature measurements;

a smoke detector controller; and a plurality of smoke detectors positioned at preset locations along the ceiling of the cargo compartment, each of the plurality of smoke detectors being at least partially exposed through the cargo compartment liner for detecting smoke in the cargo compartment, and each of the plurality of smoke detectors being configured to detect smoke within the cargo compartment and transmit a signal to the smoke detector controller in response to detecting smoke, wherein a pair of heat detectors of the multiplicity of heat detectors are associated with each smoke detector.

16. The fire detection system of claim 15, wherein the heat detector controller is configured to provide an alarm in response to determining that the fire has breached the cargo compartment liner.

17. The fire system of claim 15, wherein the multiplicity of heat detectors are implemented in pairs.

18. A method for detecting a fire, comprising:

positioning a multiplicity of heat detectors at predetermined locations on an exterior side of a cargo compartment liner from an interior of a cargo compartment or along a ceiling of the cargo compartment and on the exterior side of the cargo compartment liner from the interior of the cargo compartment, each of the multiplicity of heat detectors are configured to measure temperature and to transmit temperature measurements to a heat detector controller;

positioning a plurality of smoke detectors at preset locations along the ceiling of the cargo compartment, wherein a pair of heat detectors of the multiplicity of heat detectors are associated with each smoke detector;

receiving the temperature measurements by the heat detector controller; and determining, by the heat detector controller, that a fire has breached the cargo compartment liner based on the temperature measurements.

19. The method of claim 18, further comprises:

recording the temperature measurements as a function of time by the heat detector controller;

wherein determining that the fire has breached the cargo compartment liner comprises determining that a group of temperature measurements from at least one heat detector has exceeded a preset threshold value for a predetermined time duration; and generating an alarm in response to determining that the fire has breached the cargo compartment liner.

20. The method of claim 18, wherein positioning the multiplicity of heat detectors and positioning the plurality of smoke detectors comprises positioning onboard an aircraft.

\* \* \* \* \*